(12) United States Patent
Zeng (10) Patent No.: US 12,219,233 B2
(45) Date of Patent: Feb. 4, 2025

(54) COLOR CORRECTION DETECTION DEVICE, AND COLOR CORRECTION SYSTEM HAVING EXTERNAL FLASH

(71) Applicant: YINGYOU EQUIPMENT CO., LTD., Guangdong (CN)

(72) Inventor: Weiling Zeng, Guangdong (CN)

(73) Assignee: YINGYOU EQUIPMENT CO., LTD., Guangdong (CN)

( * ) Notice: Subject to any disclaimer, the term of this patent is extended or adjusted under 35 U.S.C. 154(b) by 84 days.

(21) Appl. No.: 18/250,669

(22) PCT Filed: Jun. 22, 2021

(86) PCT No.: PCT/CN2021/101586
§ 371 (c)(1),
(2) Date: Apr. 26, 2023

(87) PCT Pub. No.: WO2022/156139
PCT Pub. Date: Jul. 28, 2022

(65) Prior Publication Data
US 2023/0421878 A1    Dec. 28, 2023

(30) Foreign Application Priority Data

Jan. 22, 2021  (CN) .......................... 202110100291.1
Jan. 22, 2021  (CN) .......................... 202120210056.5

(51) Int. Cl.
H05B 47/19    (2020.01)
H04N 23/56    (2023.01)
H05B 47/105   (2020.01)

(52) U.S. Cl.
CPC .......... *H04N 23/56* (2023.01); *H05B 47/105* (2020.01); *H05B 47/19* (2020.01)

(58) Field of Classification Search
CPC ....... H04N 23/56; H05B 47/19; H05B 47/105
See application file for complete search history.

(56) References Cited

U.S. PATENT DOCUMENTS

2003/0068165 A1    4/2003  Hirai et al.

FOREIGN PATENT DOCUMENTS

| CN | 104280979 | 1/2015 |
|---|---|---|
| CN | 110731080 | 1/2020 |

(Continued)

OTHER PUBLICATIONS

WIPO, International Search Report for PCT/CN2021/101586, Oct. 29, 2021.

*Primary Examiner* — Henry Luong
(74) *Attorney, Agent, or Firm* — Hodgson Russ LLP (57) ABSTRACT

A color correction detection device comprises a light-emission information collection circuit and a remote communication circuit, wherein the light-emission information collection circuit is used for collecting light-emission information of an external flash; the remote communication circuit is electrically connected to the light-emission information collection circuit and is used for enabling the light-emission information to be in remote communication with a remote color correction processing device by means of the Internet; the remote color correction processing device is used for carrying out color correction processing according to the light-emission information to generate color correction result information. The color correction result information is used for being transmitted to the external flash, so as to adjust the light-emission information of the external flash.

20 Claims, 6 Drawing Sheets

(56) References Cited

FOREIGN PATENT DOCUMENTS

| | | | |
|---|---|---|---|
| CN | 110896452 | | 3/2020 |
| CN | 111277699 | | 6/2020 |
| CN | 112731733 | | 4/2021 |
| CN | 112731734 | | 4/2021 |
| CN | 112731735 | | 4/2021 |
| CN | 112731736 | | 4/2021 |
| CN | 112764292 | | 5/2021 |
| CN | 112764293 | | 5/2021 |
| CN | 112799267 | | 5/2021 |
| CN | 112859488 | | 5/2021 |
| JP | H06175187 | | 6/1994 |
| JP | 2003233101 A | * | 8/2003 |
| WO | 2022156139 | | 7/2022 |

* cited by examiner

COLOR CORRECTION DETECTION DEVICE, AND COLOR CORRECTION SYSTEM HAVING EXTERNAL FLASH

CROSS-REFERENCE TO RELATED APPLICATIONS

This application is a U.S. national stage entry of International Application No. PCT/CN2021/101586, filed Jun. 22, 2021, which claims priority to Chinese Patent Application Nos. 20110100291.1 and 202120210056.5, each filed Jan. 22, 2021, the entire disclosures of which are incorporated herein by reference.

TECHNICAL FIELD

The present application relates to the technical field of flash for photographing, in particular to a color correction detection device, and a color correction system for an external flash.

BACKGROUND

With the development of mobile communication technology, mobile terminals have played an increasingly important role in people's life and work. Mobile terminals, especially some mobile electronic devices with camera function, such as mobile phone, MP4, PDA, notebook computer, etc., bring great fun to people's lives. Photographing requires light source, and artificial light is often needed to assist in photographing besides natural light. The artificial light source of mobile terminal with photographing function often cannot meet the actual use requirements. Therefore, people often use external flash to assist in photographing.

However, after long-term use of LED beads in external flash, there is a deviation between chromaticity and luminous intensity, which leads to the actual luminous parameters such as luminous brightness and chromaticity not reaching the preset luminous parameters, thus failing to achieve the expected light supplement effect.

The above information disclosed in the Background is only for enhancement of understanding of the background of the present application and therefore it may include information that does not constitute prior art known to a person of ordinary skill in the art.

SUMMARY

There are provided a color correction detection device and a color correction system for an external flash according to embodiments of the present disclosure. The technical solution is as below:

According to one aspect of the present application, there is further provided a color correction detection device, which includes:

a light-emission information collection circuit configured to collect light-emission information of an external flash; and a remote communication circuit electrically connected to the light-emission information collection circuit for transmitting the light-emission information to a remote color correction processing device through a network communication system; wherein the remote color correction processing device is configured to carry out color correction processing according to the light-emission information to generate color correction result information; wherein the color correction result information is transmitted to the external flash to adjust the light-emission information of the external flash.

According to another aspect of the present application, there is provided a color correction system for an external flash, including the external flash, the above color correction detection device, and the remote color correction processing device;

wherein the color correction detection device is configured to collect the light-emission information of the external flash, and the remote color correction processing device communicates with the color correction detection device remotely to receive the light-emission information of the external flash detected by the color correction detection device, and carries out color correction processing according to the light-emission information to generate color correction result information; and the external flash is configured to receive the information result information and operate according to the color correction result.

It should be understood that the above general description and the following detailed description are exemplary only and are not intended to limit the present application.

BRIEF DESCRIPTION OF DRAWINGS

The above and other objects, features and advantages of the present application will become more apparent by describing exemplary embodiments thereof in detail with reference to the accompanying drawings.

DESCRIPTION OF THE EMBODIMENTS

Although the present application can readily be embodied in different forms of embodiment, however, only some of the specific embodiments are shown in the drawings and will be described in detail in the description, while it is understood that the description is to be regarded as an exemplary illustration of the principles of the present application and is not intended to limit the present application to those described herein.

Thus one feature pointed out in the description is intended to illustrate one of the features of one embodiment of the present application and is not intended to imply that each embodiment of the present application must have the illustrated feature. In addition, it should be noted that many features are described in the description. Although certain features may be combined to illustrate a possible system design, these features may also be used for other unspecified combinations. Therefore, unless otherwise stated, the illustrated combinations are not intended to be limiting.

In the embodiments illustrated in the drawings, indications of direction (such as up, down, left, right, front and back) are used to explain that the structure and movement of the various elements of the present application are not absolute but relative. These descriptions are appropriate when these elements are in the positions shown in the drawings. If the description of the positions of the elements changes, the indications of the directions change accordingly.

The exemplary embodiments will now be described more fully with reference to the accompanying drawings. However, the exemplary embodiments can be implemented in a variety of forms and should not be construed as being limited to the examples set forth herein. Rather, these embodiments are provided so that the present application will be more comprehensive and complete, and the concept of exemplary embodiments will be fully communicated to those skilled in the art. The accompanying drawings are only schematic illustrations of the present application and are not necessarily drawn to scale. Like reference signs in the figures denote identical or similar parts and thus repetitive descriptions thereof will be omitted.

The embodiments of the present application are further elaborated below in conjunction with the accompanying drawings of the description.

Firstly, the present application provides a color correction detection device for color correction of an external flash. Color correction may refer to matching the actual luminous parameters of the external flash with the set luminous parameters. It can also refer to adjusting the consistency of luminous parameters of each LED bead in the external flash.

Figure 1:
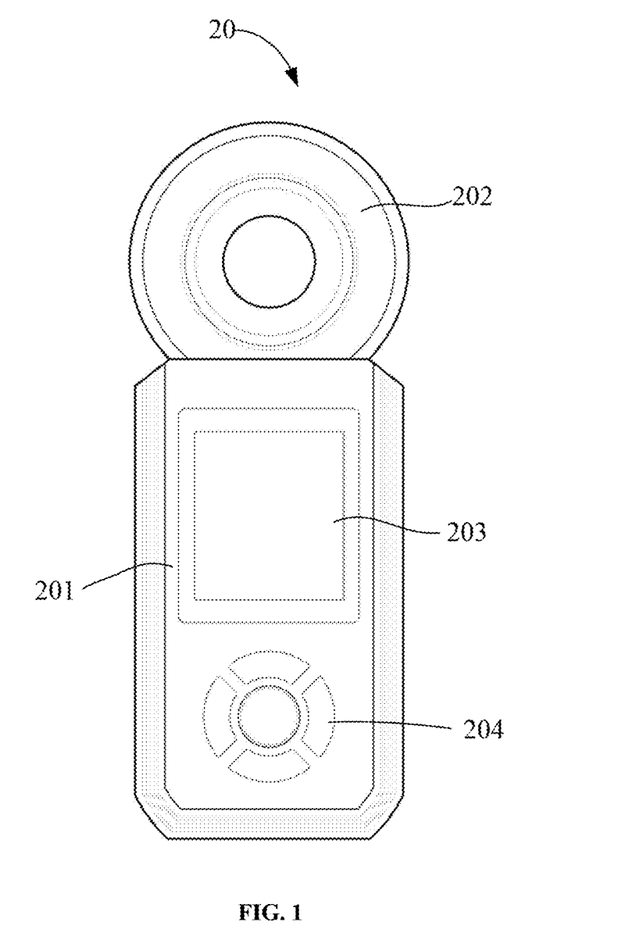
FIG. 1 is a structural diagram of a color correction detection device according to an exemplary embodiment.
Figure 2:
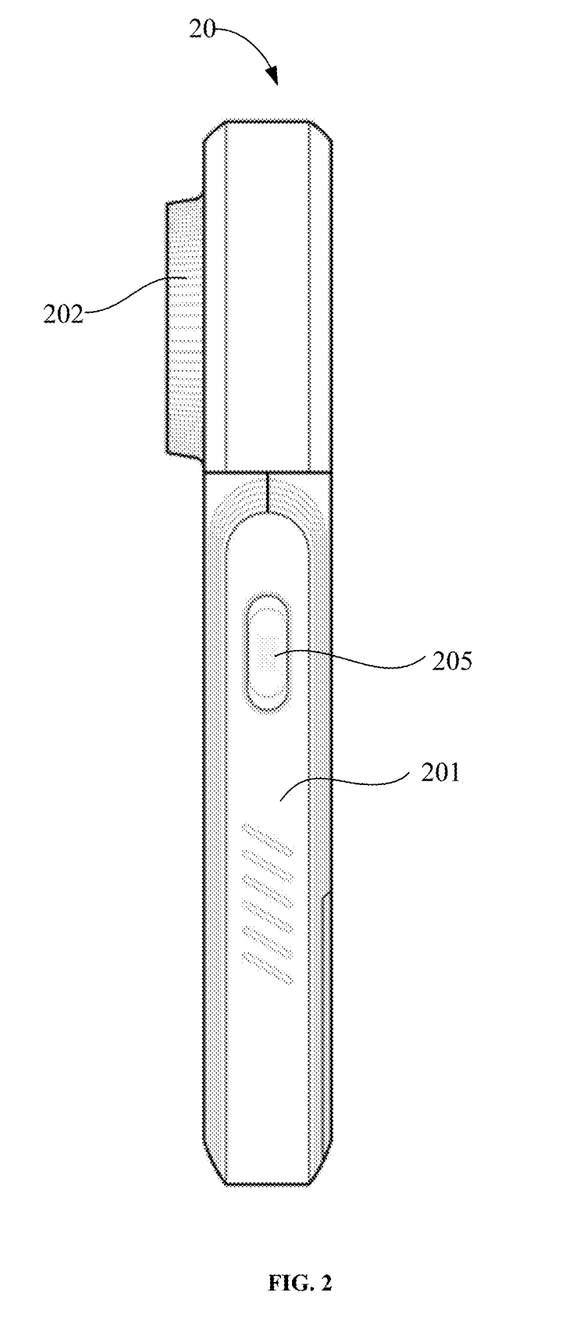
FIG. 2 is a side view of FIG. 1.

Referring to FIG. 1 and FIG. 2, in an embodiment, the color correction detection device 20 includes a body 201 and a light pickup portion 202 protruding from one side of the body 201. In particular, the body 201 is generally square and has an accommodating cavity within the body 201 to accommodate one or more circuit boards. It should be understood that the relevant circuits of the present application may be partially or fully laid on the circuit boards. A toggle key 205 is also provided at the side surface of the body 201. When the toggle key 205 is in an open state, the color correction detection device 20 is activated, and when the toggle key 205 is in a closed state, the color correction detection device 20 is turned off. The light pickup portion 202 is located on the upper side of the body 201. Since the light radiation range of the external flash 10 is substantially circular, the light pickup portion section 202 is also substantially circular to uniformly pick up the light emitted by the external flash 10. The color correction detection device 20 of the present application may be a handheld device, which is convenient for the user to carry out color correction on the external flash at any time.

The body 201 and the light pickup portion 202 may be detachably connected. Specifically, the light pickup portion can be connected to the body in a snap-fit manner, or the light pickup portion and the body are connected by matching a chute and a slider. The chute can be provided on the body 201, and the slider on the light pickup portion 202.

Figure 3:
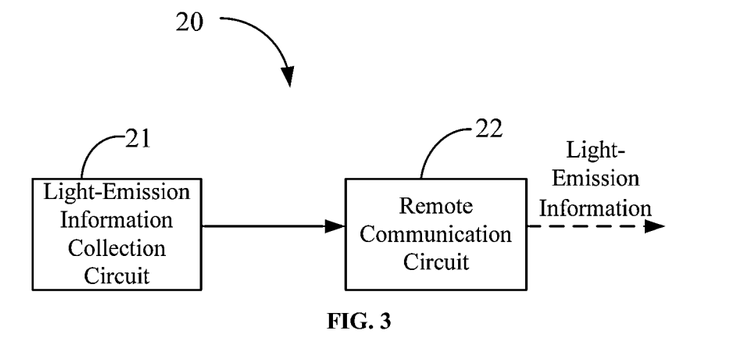
FIG. 3 is a circuit configuration block diagram of the color correction detection device according to an exemplary embodiment.

Referring to FIG. 3, in an embodiment, the color correction detection device includes a light-emission information collection circuit 21 and a remote communication circuit 22. The light-emission information collection circuit 21 is used for collecting light-emission information of an external flash 10. The remote communication circuit 22 is electrically connected to the light-emission information collection circuit 21 and is used for enabling the light-emission information to be in remote communication with a remote color correction processing device 50 by means of the Internet; the remote color correction processing device 50 is used for carrying out color correction processing according to the light-emission information to generate color correction result information. The color correction result information is used for being transmitted to the external flash 10, so as to adjust the light-emission information of the external flash 10.

In this embodiment, "remote" means between connected systems, performing a connection by means of analog or digital signal modulation techniques. The remote communication circuit 22 can communicate with remote color correction processing device through one or more network systems of Ethernet communication, GPRS communication, radio station communication, and local Modem communication. It should be understood that corresponding telecommunication circuits are set according to the network system to be based on.

The color correction detection device 20 in the present application collects light-emission information of an external flash using a light-emission information collection circuit 21. The remote communication circuit 22 transmits the light-emission information to the remote color correction processing device 50 through the network communication system. The remote color correction processing device 50 is configured for carrying out color correction processing according to the light-emission information to generate color correction result information. The color correction result information is used for being transmitted to the external flash 10, so as to adjust the light-emission information of the external flash 10. Therefore, the solution of the present application achieves light-emission correction of the external flash 10.

In addition, the color correction detection device 20 of the present application does not need to perform logical operation on the light-emission information, but only needs to send the light-emission information to the remote color correction processing device 50, so the color correction detection device 20 does not need to set up a color correction processing circuit, thus reducing the size of the color correction detection device, so as to achieve the miniaturization of the color correction detection device 20, and it is easy for the user to carry, in order to carry out light-emission information detection at any time. In a specific embodiment, the color correction detection device is a handheld device.

In addition, the color correction detection device 20 of the present application can be electrically connected to the remote color correction processing device 50, so that the color correction result can be improved by utilizing the powerful computing resources of the remote color correction processing device 50.

Specifically, the light-emission information of the external flash 10 is collected by the light-emission information collection circuit 21 of the color correction detection device. In this embodiment, the light-emission information includes one or more of luminance, chromaticity, saturation and the like. In this embodiment, the external flash 10 can be viewed as a whole to collect its luminance, chrominance, saturation and other parameters. In another embodiment, the light-emission information is one or more parameters of luminance, chromaticity, saturation and the like, of each LED light source in the flash lamp including a plurality of LED light sources. That is, in this embodiment, each LED light source is taken as the minimum unit, and light-emitting correction is performed pertinently for each LED, thereby improving the accuracy of light-emitting correction. During detection, each LED light source can emit light independently, so as to obtain the light-emission information of the LED light source.

The light-emission information collection circuit 21 may include a light pickup unit. According to the target to be corrected, the color pickup unit may include various types of optical sensors, such as luminance sensor, chromaticity sensor, color temperature sensor, etc. The color correction detection device 20 generally has an acquisition window exposed on the surface of the color correction detection device 20. The acquisition window is arranged facing the light-emitting surface of the external flash 10, so that the color pickup unit can receive the light emitted by the external flash 10. In this embodiment, the light emitted by the external flash 10 can be picked up multiple times. Schematically, the external flash 10 is made to work in a variety of light-emitting modes, all for sampling light-emission information.

The color correction detection device 20 further may have a data conversion circuit. The data conversion circuit is electrically connected to the light-emission information collection circuit 21 to convert collected analog light-emission information into digital light-emission information. Digital light-emission information is convenient to be transmitted through a communication network system, which reduces data loss and improves the stability of data transmission.

Figure 4:
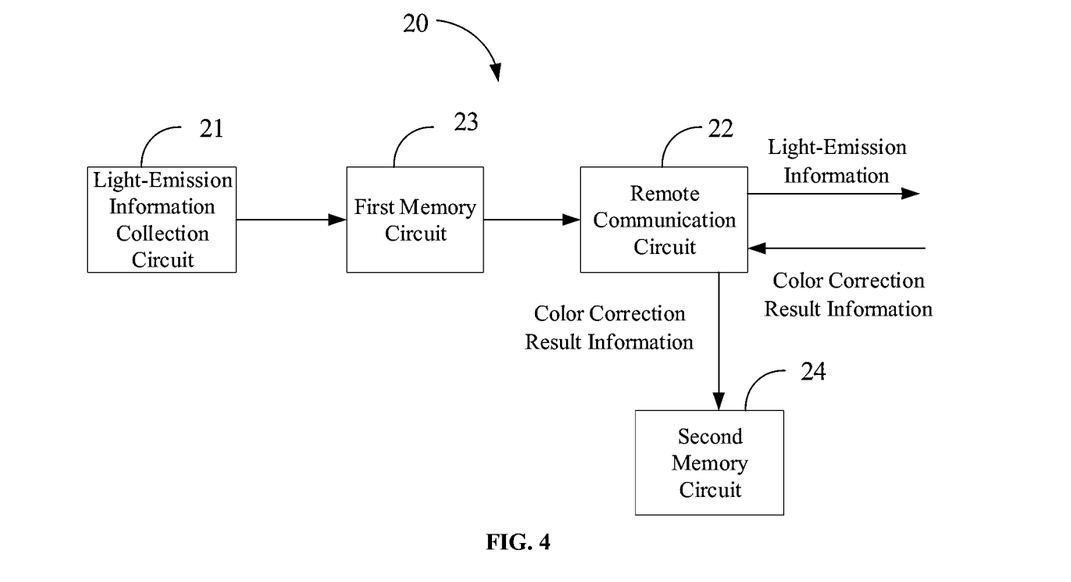
FIG. 4 is a circuit configuration block diagram of the color correction detection device according to another exemplary embodiment.

Referring to FIG. 4, in an embodiment, the color correction detection device further includes a first memory circuit 23. The first memory circuit 23 is electrically connected to the light-emission information collection circuit 21 for storing light-emission information. The first memory circuit 23 is connected to the remote communication circuit 22 to transmit stored light-emission information to the remote color correction processing device 50 through the remote communication circuit 22. Therefore, in this embodiment, after collecting the light-emission information, the color correction detection device 20 can store the light-emission information without immediately transmitting it to the remote color correction processing device 50 through the remote communication circuit 22. The flexibility of the user using the color correction detection device 20 is improved and the color correction detection device 20 is allowed to sequentially collect light-emission information for a plurality of external flashes 10.

In an embodiment, the remote communication circuit 22 includes a first communication interface configured to be connected to a first communication line, so as to transmit the light-emission information to a network communication system. The first communication interface may be one or more of an RJ-45 interface, an RJ-11 interface, an SC optical fiber interface, an FDDI interface, and an AUI interface. The first communication interface is connected to the communication network through a communication cable.

Figure 5:
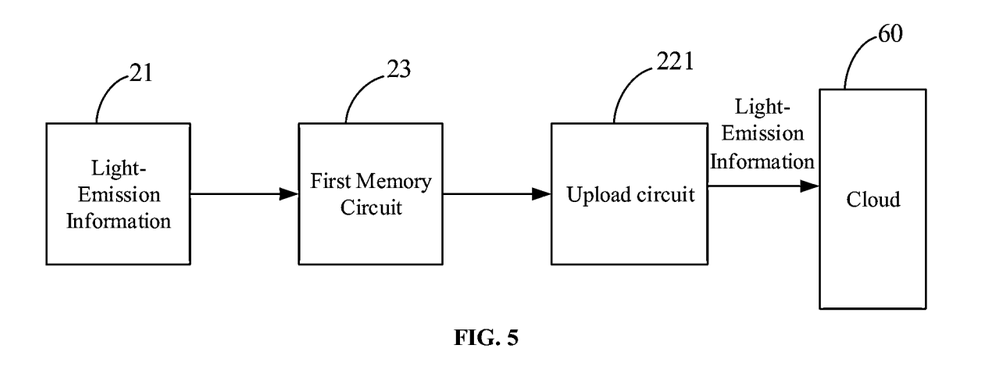
FIG. 5 is a circuit configuration block diagram of the color correction system for uploading light-emission information to a cloud according to an exemplary embodiment.

Referring to FIG. 5, in another embodiment, the telecommunication circuit 22 includes an upload circuit 221. The upload circuit 221 is configured to upload the light-emission information to the cloud 60 for being downloaded by the remote color correction processing device 50. In this embodiment, the color correction detection device may perform the uploading operation and the light-emission information collection operation synchronously, or the color correction detection device may first collect the light-emission information and then upload it together.

After receiving the light-emission information, the remote color correction detection device 20 performs color correction processing and generates the color correction result information. In this embodiment, the remote color correction detection device 20 includes a data arrangement circuit and a data processing circuit. The data arrangement circuit performs data arrangement on the collected light-emission information data. The specific data arrangement mode may be determined according to the color correction algorithm, or may be arranged one-to-one according to the position arrangement of the LED in the external flash 10.

The data processing circuit may be stored with a color correction processing algorithm, and a logical calculation is performed on the arranged light emission data by means of the color correction processing algorithm, thereby generating the color correction result information. The color correction result information can be an adjustment program or a specific light-emitting correction value.

Schematically, in an example, the data processing circuit includes a correction chip having a correction coefficient matrix, and calculates and processes the sampled data after the arrangement based on the correction coefficient matrix.

It is also possible to correct the driving current of the external flash 10 by comparing the preset parameter value with the sampled light-emission information arrangement data, so that the corrected driving current drives the external flash 10 so that the actual light-emitting parameters of the flash match the set parameters.

In this embodiment, since the color correction detection device 20 communicates remotely with the remote color correction processing device 50 through the remote communication circuit 22, the remote color correction processing device 50 can be provided with more accurate algorithm modules, more diversified detection functions, and processing circuits with higher performance without being limited by portability, size and the like, thereby improving the accuracy of color correction result information and the diversification of color correction modes, and providing an excellent color correction effect for the external flash 10.

In an embodiment, the remote communication circuit 22 is further configured to receive color correction result information from the remote color correction processing device 50. The color correction detection device further comprises a second communication interface. The second communication interface is configured to be connected to a second communication line to receive the color correction result information transmitted by the remote color correction processing device 50 through the network communication system. The second communication interface may be one or more of an RJ-45 interface, an RJ-11 interface, an SC optical fiber interface, an FDDI interface, and an AUI interface. The second communication interface is connected to the communication network through a communication cable.

The second communication interface and the first communication interface can be the same or two independent communication interfaces.

Figure 6:
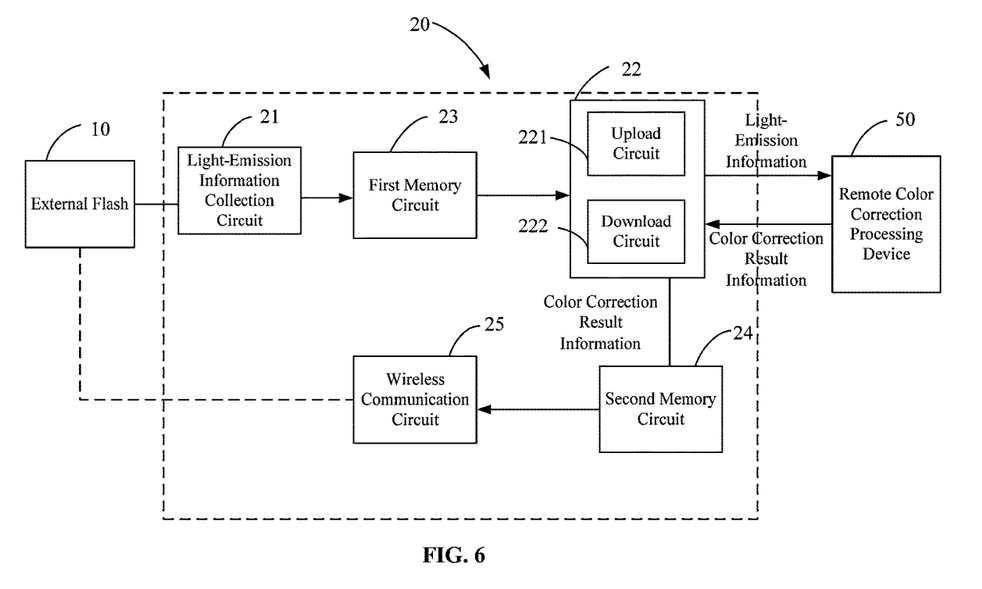
FIG. 6 is a circuit configuration block diagram of a color correction system of an external flash according to an exemplary embodiment.

Referring to FIG. 6, in an embodiment, the remote communication circuit 22 is further configured to receive color correction result information from the remote color correction processing device 50. The remote communication circuit 22 also includes a download circuit 222. The download circuit 222 is used for downloading color correction result information from the cloud 60.

Referring further to FIG. 4, in an embodiment, the color correction detection device further includes a second memory circuit 24. The second memory circuit 24 is electrically connected to the download circuit 222 to store the color correction result information downloaded by the download circuit 222 from the cloud 60. The second memory circuit 24 may store color correction result information of a plurality of external flashes 10, thereby improving the utilization rate of the color correction detection device.

The color correction result information, after downloading, can be forwarded to the external flash 10. In an embodiment, the color correction detection device also has a wireless communication circuit 25. The wireless communication circuit 25 is electrically connected to the second memory circuit 24 to transmit the color correction result information stored in the memory circuit to the external flash 10 through a wireless transmission mode. The wireless communication circuit 25 includes one or more of a WIFI module, a Bluetooth module, or a Zig-Bee module and an infrared communication module. This embodiment improves the convenience of communication between the color correction detection device and the external flash 10.

In another embodiment, the color correction detection device also has a third communication interface electrically connected to the second memory circuit 24, and the third communication interface is electrically connected to the external flash 10 through a connection line to transmit the color correction result information stored in the second memory circuit 24 to the external flash 10. The third communication interface is one of a USB interface, a TYPE C interface, an RS232 interface and an RS485 interface. In this embodiment, there may be one or more third communication interfaces.

Figure 7:
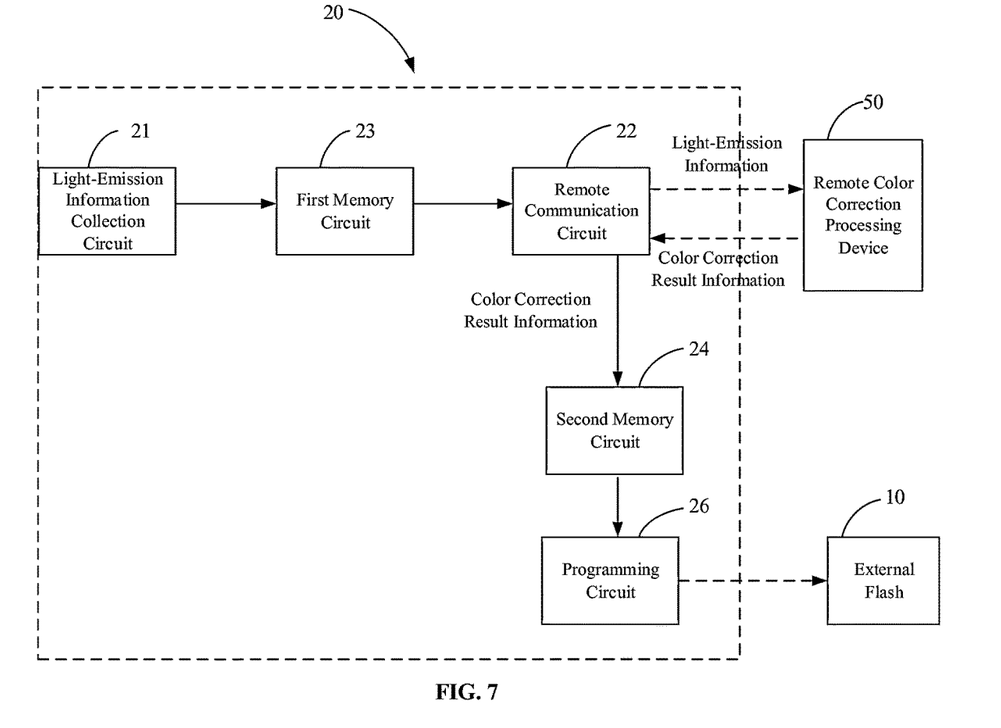
FIG. 7 is a circuit configuration block diagram of the color correction system of the external flash according to another exemplary embodiment.

Referring to FIG. 7, in an embodiment, the color correction detection device 20 further includes a programming circuit 26. The programming circuit 26 is electrically connected to the second memory circuit 24, and the programming circuit 26 is used for reading the color correction result information from the second memory circuit 24. The programming circuit 26 is electrically connected to the external flash 10 to program the color correction result information onto the control chip of the external flash 10.

The programming circuit 26 can carry out handshake communication with the external flash 10 and meet the related communication protocol, so as to smoothly carry out program programming, adjust the light-emitting control program of the original control chip and adjust the driving current of the light source circuit of the external flash 10, thereby fundamentally correcting the problem of luminous effect deviation of the external flash 10.

In this embodiment, the programming circuit 26 and the second memory circuit 24 may be electrically connected directly or indirectly. In an example, the wireless communication circuit 25 collects the color correction result information from the second memory circuit 24, and transmits the color correction result information to the programming circuit 26 (the programming circuit 26 is correspondingly provided with a wireless receiving unit) in a wired or wireless manner, and the programming circuit 26 programs the color correction result information into the control chip of the external flash 10. In another example, the wireless communication circuit 25 may be omitted, and the programming circuit 26 directly collects the color correction result information from the second memory circuit 24 and programs the color correction result information onto the control chip of the external flash 10. The programming circuit 26 may be built into the casing of the color correction detection device 20. It may also be externally placed outside the casing of the color correction detection device 20 to form an independent module.

The programming circuit 26 may be built into the casing of the color correction detection device 20. It can also be externally placed outside the casing of the color correction detection device 20 to form an entity module.

Figure 8:
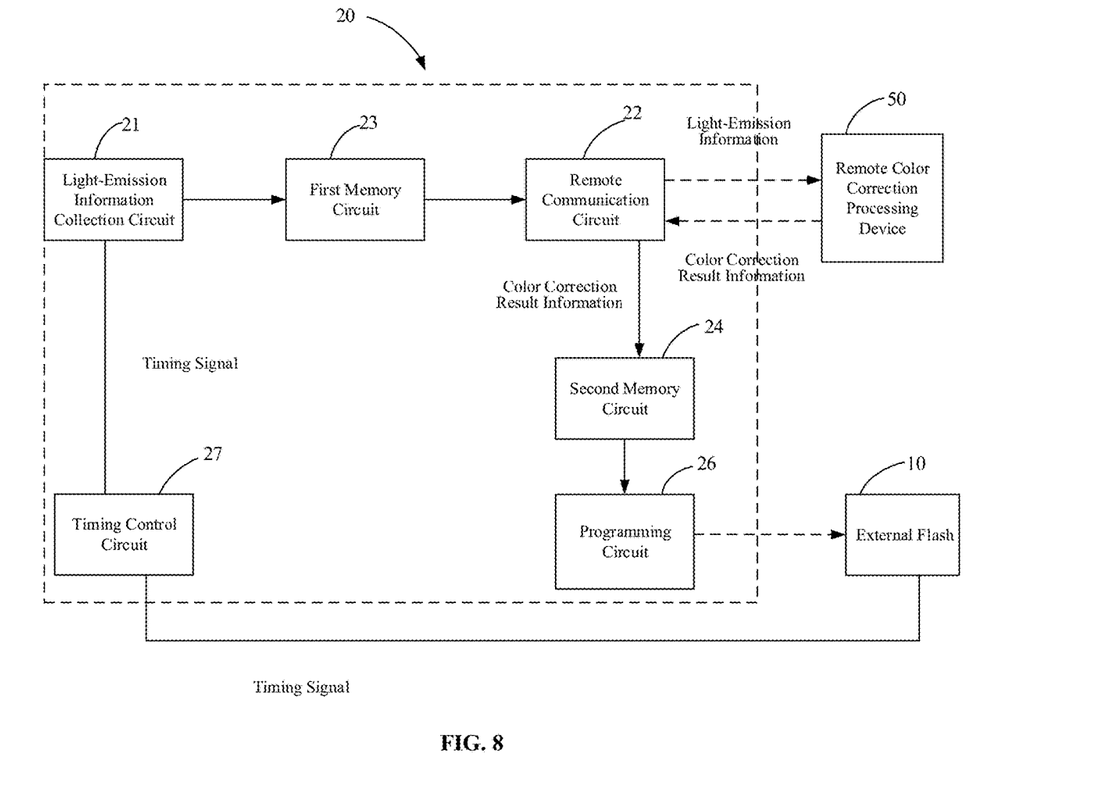
FIG. 8 is a circuit configuration block diagram of the color correction system of the external flash according to another exemplary embodiment.

Referring to FIG. 8, in an embodiment, the color correction detection device 20 further includes a timing control circuit 27. The timing control circuit 27 is electrically connected to the light-emission information collection circuit 21 and is electrically connected to the external flash 10. The timing control circuit 27 transmits a timing signal to the external flash 10 and the light-emission information collection circuit 21 to cause the external flash 10 to emit light at a preset timing, and causes the light-emission information collection circuit 21 to collect the light-emission information at the preset timing.

In this embodiment, the timing control circuit 27 can issue a corresponding timing control signal according to the color correction control instruction. The timing control circuit 27 may issue timing instructions including a light-emitting mode execution sequence, a light-emitting frequency, a brightness change timing, a color change and the like of the external flash 10. The timing control circuit 27 is arranged so that the acquisition timing and the light emission timing are synchronized, the timing information corresponding to the acquired light-emission information can be determined, and the correction accuracy can be improved. Moreover, in this embodiment, the color correction detection device 20 is allowed not to collect data when the external flash 10 does not emit light, thereby facilitating the reduction of noise interference to the color correction detection device 20 and improving the accuracy of the sampled light emitting data, which is beneficial to saving energy.

Figure 9:
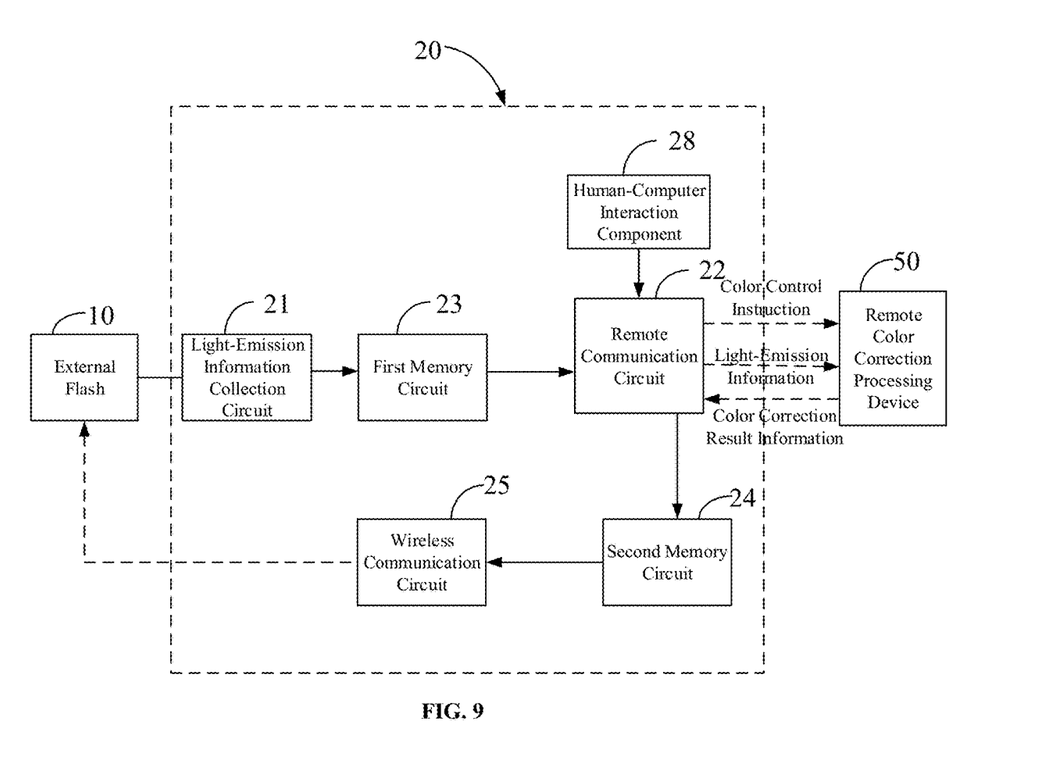
FIG. 9 is a circuit configuration block diagram of the color correction system of the external flash according to yet another exemplary embodiment.

Referring to FIG. 9, in an embodiment, the color correction detection device 20 may include a human-computer interaction component 28. The human-computer interaction component 28 is electrically connected to the remote communication circuit 22. The human-computer interaction component 28 is used for receiving a color correction control instruction. The remote communication circuit 22 is used for sending the color correction control instruction to the remote color correction processing device 50. The remote color correction processing device 50 performs color correction processing according to the color correction control instruction.

The color correction control instruction includes, but is not limited to, a color correction start/stop instruction, a color correction parameter setting instruction, a color correction mode switching instruction, a color correction accuracy setting instruction, and the like.

The human-computer interaction component 28 may include one or more of a key receiving component, a voice input component, a touch input component, and a gesture control component. The human-computer interaction module 28 is electrically connected to the remote communication circuit 22 in the color correction detection device 20 to send the color correction control instruction to the remote color correction processing device 50 by wireless or wired communication. In addition, the external flash 10 adjusts the light emitting mode according to the color correction control instruction, and the color correction detection device 20 collects the light-emission information according to the color correction control instruction. In an embodiment, the human-computer interaction component 28 includes a key 204 disposed on the body 201.

In an embodiment, the color correction detection device includes a display screen 203. The display screen 203 is configured to display a color correction control interface, and the display content of the color correction control interface includes one or more of color correction start/stop information, color correction parameter setting information and color correction mode switching information.

Specifically, a color correction application software is installed in the color correction detection device 20, and when the color correction application software is run, a color correction control interface can be displayed on the display screen 203. The color correction control interface has a plurality of controls for users to issue color correction start instructions, set color correction parameters, select color correction modes (collectively referred to as color correction control instructions here) and so on. The color correction control interface can also have a display window to display the color correction process. This embodiment improves the human-computer interaction capability, and is convenient for the user to correct different parameters (luminance, chrominance, saturation, etc.) of the external flash 10 according to his own requirements, and correct them to target parameters that meet his own requirements. The color correction control instruction may be transmitted to the remote color correction processing device 50 through the remote communication circuit 22 so that the remote color correction processing device 50 processes the light-emission information in accordance with the color correction control instruction.

The display screen 203 may also communicate with the remote color correction processing device 50 through the remote communication circuit to display the color correction control interface under the control of the remote color correction processing device 50. The "communicate with" here requires only that the display screen 203 and the remote color correction processing device 50 are able to transmit data to each other.

The color correction parameters can include color correction accuracy parameters, color correction target parameters and the like. The color correction mode may include a luminance correction mode, a chrominance correction mode, a saturation correction mode, and a comprehensive correction mode (simultaneously correcting luminance, chrominance, saturation, etc.).

In an embodiment, the display screen 203 may be a touch screen, on which a virtual button for issuing a start/stop color correction instruction, a virtual keyboard for inputting color correction parameters, color correction modes, a drop-down menu, and the like are displayed. This embodiment effectively facilitates the operation of the user and facilitates the reduction of the size of the color correction detection device 20.

The light-emission information and the color correction result information only indicate the substantial meaning of the signal. In fact, in the process of signal transmission, the form will change. For example, conversion of analog and digital signals, transmission as a single signal or transmission in the form of packets, etc. are not specifically limited herein.

Referring to FIG. 6, the present application also provides a color correction system for an external flash. The color correction system includes the external flash 10, the color correction detection device 20 and the remote color correction processing device 50. The color correction detection device is configured to collect the light-emission information of the external flash 10, and the remote color correction processing device 50 communicates with the color correction detection device 20 remotely to receive the light-emission information of the external flash 10 detected by the color correction detection device, and carries out the color correction processing according to the light-emission information to generate the color correction result information. The external flash 10 is configured to receive color correction result information and operates according to the color correction result information.

While the present application has been described with reference to several exemplary embodiments, it should be understood that the terms used herein are illustrative and exemplary and are not limiting. Since the present application can be embodied in various forms without departing from the spirit or essence of the invention, it should therefore be understood that the foregoing embodiments are not limited to any of the foregoing details, but are to be interpreted broadly within the spirit and scope defined by the appended claims, so that all variations and modifications falling within the scope of the claims or their equivalents are to be covered by the appended claims.

What is claimed is:

1. A color correction detection device comprising:
   a light-emission information collection circuit configured to collect light-emission information of an external flash; and
   a remote communication circuit electrically connected to the light-emission information collection circuit for transmitting the light-emission information to a remote color correction processing device through a network communication system, wherein the remote color correction processing device is configured to carry out color correction processing according to the light-emission information to generate color correction result information, wherein the color correction result information is transmitted to the external flash to adjust the light-emission information of the external flash.

2. The color correction detection device according to claim 1, wherein the color correction detection device further comprises a first memory circuit electrically connected to the light-emission information collection circuit for storing the light-emission information, wherein the first memory circuit is connected to the remote communication circuit to transmit the stored light-emission information to the remote color correction processing device through the remote communication circuit.

3. The color correction detection device according to claim 1, wherein the remote communication circuit comprises a first communication interface configured to be connected to a first communication line, so as to transmit the light-emission information to the network communication system.

4. The color correction detection device according to claim 1, wherein the remote communication circuit includes an upload circuit; and
   wherein the upload circuit is configured to upload the light-emission information to a cloud for being downloaded by the remote color correction processing device.

5. The color correction detection device according to claim 1, wherein the remote communication circuit is further configured to receive the color correction result information from the remote color correction processing device; and
   wherein the color correction detection device further comprises a second communication interface configured to be connected to a second communication line to receive the color correction result information transmitted by the remote color correction processing device through the network communication system.

6. The color correction detection device according to claim 1, wherein the remote communication circuit is further configured to receive the color correction result information from the remote color correction processing device; and
wherein the remote communication circuit further comprises a download circuit configured to download the color correction result information from a cloud.

7. The color correction detection device according to claim 6, wherein the color correction detection device further comprises a second memory circuit, wherein the second memory circuit is electrically connected to the download circuit to store the color correction result information downloaded by the download circuit from the cloud.

8. The color correction detection device according to claim 7, wherein the color correction detection device further comprises a wireless communication circuit, wherein the wireless communication circuit is electrically connected to the second memory circuit to transmit the color correction result information stored in the second memory circuit to the external flash by wireless transmission.

9. The color correction detection device according to claim 7, wherein the color correction detection device further comprises a third communication interface electrically connected to the second memory circuit, wherein the third communication interface is electrically connected to the external flash through a connecting line to transmit the color correction result information stored in the second memory circuit to the external flash.

10. The color correction detection device according to claim 7, wherein the color correction detection device further comprises a programming circuit, wherein the programming circuit is electrically connected to the second memory circuit to read the color correction result information from the second memory circuit; and
wherein the programming circuit is electrically connected to the external flash to program the color correction result information onto a control chip of the external flash.

11. The color correction detection device according to claim 1, wherein the color correction detection device further comprises a timing control circuit, wherein the timing control circuit is electrically connected to the light-emission information collection circuit and is electrically connected to the external flash; and
wherein the timing control circuit issues a timing signal to the external flash and the light-emission information collection circuit so that the external flash emits light at a preset timing and the light-emission information collection circuit collects the light-emission information at a preset timing.

12. The color correction detection device according to claim 1, wherein the color correction detection device further comprises a data conversion circuit, wherein the data conversion circuit is electrically connected to the light-emission information collection circuit to convert analog light-emission information collected into digital light-emission information.

13. The color correction detection device according to claim 1, wherein the color correction detection device further comprises a human-computer interaction component, wherein the human-computer interaction component is electrically connected to the remote communication circuit, wherein the human-computer interaction component is configured to receive a color correction control instruction, wherein the remote communication circuit is configured to transmit the color correction control instruction to the remote color correction processing device; and
wherein the remote color correction processing device carries out color correction processing according to the color correction control instruction.

14. The color correction detection device according to claim 13, wherein the color correction detection device comprises a display screen communicating with the remote color correction processing device through a remote communication circuit for displaying a color correction control interface;
wherein display content of the color correction control interface comprises one or more of color correction start/stop information, color correction parameter setting information and color correction mode switching information.

15. The color correction detection device according to claim 14, wherein the display screen is a touch screen for receiving a color correction control instruction.

16. The color correction detection device according to claim 1, wherein the color correction detection is a handheld device.

17. A color correction system for an external flash, comprising the external flash, a color correction detection device, and a remote color correction processing device;
wherein the color correction detection device comprising:
a light-emission information collection circuit configured to collect light-emission information of an external flash; and
a remote communication circuit electrically connected to the light-emission information collection circuit for transmitting the light-emission information to a remote color correction processing device through a network communication system, wherein the remote color correction processing device is configured to carryout color correction processing according to the light-emission information to generate color correction result information, wherein the color correction result information is transmitted to the external flash to adjust the light-emission information of the external flash;
wherein the color correction detection device is configured to collect the light-emission information of the external flash, and the remote color correction processing device communicating communicates with the color correction detection device remotely to receive the light-emission information of the external flash detected by the color correction detection device, and carries out color correction processing according to the light-emission information to generate color correction result information; and wherein the external flash is configured to receive the color correction result information and correct light emission according to the color correction result.

18. The color correction system for an external flash according to claim 17, wherein the color correction detection device further comprises a first memory circuit electrically connected to the light-emission information collection circuit for storing the light-emission information, wherein the first memory circuit is connected to the remote communication circuit to transmit the stored light-emission information to the remote color correction processing device through the remote communication circuit.

19. The color correction system for an external flash according to claim 17, wherein the remote communication circuit comprises a first communication interface configured to be connected to a first communication line, so as to transmit the light-emission information to the network communication system.

20. The color correction system for an external flash according to claim 17, wherein the remote communication circuit is further configured to receive the color correction result information from the remote color correction processing device; and     wherein the color correction detection device further comprises a second communication interface configured to be connected to a second communication line to receive the color correction result information transmitted by the remote color correction processing device through the network communication system.

\* \* \* \* \*